US010785234B2

(12) United States Patent
Solow et al.

(10) Patent No.: US 10,785,234 B2
(45) Date of Patent: Sep. 22, 2020

(54) DYNAMIC PACKET INSPECTION PLAN SYSTEM UTILIZING RULE PROBABILITY BASED SELECTION

(71) Applicant: Cisco Technology, Inc., San Jose, CA (US)

(72) Inventors: Hillel Solow, Beit Shemesh (IL); Steve Epstein, Hashmonaim (IL); Ezra Darshan, Beit Shemesh (IL); Arnold Zucker, Hashmonaim (IL); Shali Mor, Modiin (IL); Asaf Cohen, Jerusalem (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 630 days.

(21) Appl. No.: 15/189,023

(22) Filed: Jun. 22, 2016

(65) Prior Publication Data
US 2017/0374082 A1  Dec. 28, 2017

(51) Int. Cl.
*H04L 29/06* (2006.01)
*G06F 21/55* (2013.01)

(52) U.S. Cl.
CPC ...... *H04L 63/1416* (2013.01); *H04L 63/1408* (2013.01); *H04L 63/1425* (2013.01); *H04L 63/20* (2013.01); *G06F 21/554* (2013.01); *H04L 63/0263* (2013.01)

(58) Field of Classification Search
CPC ............... H04L 63/0263; H04L 41/147; H04L 41/0816; G06F 17/30707
USPC ......................................................... 726/1
See application file for complete search history.

(56) References Cited

U.S. PATENT DOCUMENTS

| 6,405,318 | B1 | 6/2002 | Rowland |
| 7,158,024 | B2 | 1/2007 | Chung et al. |
| 7,305,708 | B2 | 12/2007 | Norton et al. |
| 7,382,782 | B1 * | 6/2008 | Ferguson ............ H04L 45/60 370/395.41 |
| 7,450,005 | B2 | 11/2008 | Anand |
| 7,685,271 | B1 | 3/2010 | Schneider et al. |
| 8,347,375 | B2 | 1/2013 | Graham et al. |
| 8,646,026 | B2 | 2/2014 | Chang |
| 8,881,276 | B2 | 11/2014 | Kratzer et al. |
| 8,893,276 | B2 | 11/2014 | Sutherland |
| 8,990,937 | B2 | 3/2015 | Durie |
| 9,117,174 | B2 | 8/2015 | Cox et al. |

(Continued)

OTHER PUBLICATIONS

Riquet, Damien et al.; DISCUS: A Massively Distributed IDS Architecture Using a DSL-Based Configuration, Information Science, Electronics and Electrical Engineering (ISEEE), 2014 International Conference on, Sapporo, pp. 1193-1197.

(Continued)

*Primary Examiner* — Bryan F Wright (57) ABSTRACT

In one example, a method includes for each one time period of a plurality of time periods performing a weighted random selection of a first set of intrusion detection/protection system rules from a plurality of rules, each rule of the plurality of rules having an associated probability of selection, preparing a packet inspection plan including the first set of intrusion detection/protection system rules, and sending the packet inspection plan to a network distribution device to inspect packets according to the packet inspection plan. Related apparatus and methods are also described.

20 Claims, 5 Drawing Sheets

(56) References Cited

U.S. PATENT DOCUMENTS

| | | | |
|---|---|---|---|
| 9,213,939 B2 | 12/2015 | Hauser | |
| 2002/0184181 A1* | 12/2002 | Agarwal | G06F 17/30707 |
| 2006/0195896 A1* | 8/2006 | Fulp | H04L 63/0263 |
| | | | 726/11 |
| 2006/0248580 A1* | 11/2006 | Fulp | H04L 63/0263 |
| | | | 726/11 |
| 2007/0016590 A1* | 1/2007 | Appleby | H04L 41/147 |
| 2007/0070907 A1* | 3/2007 | Kumar | H04L 47/30 |
| | | | 370/235 |
| 2010/0125900 A1 | 5/2010 | Dennerline et al. | |
| 2010/0251370 A1 | 9/2010 | Sun et al. | |
| 2010/0309783 A1* | 12/2010 | Howe | H04L 43/0852 |
| | | | 370/230 |
| 2012/0284791 A1* | 11/2012 | Miller | G06F 21/554 |
| | | | 726/22 |
| 2014/0108319 A1* | 4/2014 | Klauser | H04L 41/0816 |
| | | | 706/47 |
| 2015/0092549 A1* | 4/2015 | Anand | H04L 47/22 |
| | | | 370/230.1 |
| 2016/0301601 A1* | 10/2016 | Anand | H04L 69/22 |
| 2017/0262523 A1 | 9/2017 | Epstein et al. | |

OTHER PUBLICATIONS

Palo Alto Networks, "The PA-5000 Series Architecture the Evolution of the Single Pass Parallel Processing Architecture", Palo Alto Networks, Oct. 2011, Santa Clara, CA, 11 pages.

* cited by examiner

DYNAMIC PACKET INSPECTION PLAN SYSTEM UTILIZING RULE PROBABILITY BASED SELECTION

TECHNICAL FIELD

The present disclosure generally relates to Intrusion Protection Systems (IPS) or Intrusion Detection Systems (IDS).

BACKGROUND

Intrusion Protection Systems (IPS) or Intrusion Detection Systems (IDS) may be operative in devices with constrained resources (e.g., central processing unit (CPU), memory etc.). Therefore, the number of IPS/IDS rules that can be enforced or packets that can be inspected may be limited. An IPS/IDS ruleset may, by way of example, include 40,000 or more rules that can potentially protect networks from attacks. Large scale enterprise systems may deploy fully functional IDS/IPS appliances capable of filtering tens of Gigabits of traffic for all 40,000 rules. There are many environments, however, where the cost of deploying such an appliance is prohibitive.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided in accordance with an embodiment of the present disclosure, a method including for each one time period of a plurality of time periods performing a weighted random selection of a first set of intrusion detection/protection system rules from a first plurality of rules, each rule of the first plurality of rules having an associated probability of selection, preparing a packet inspection plan including the first set of intrusion detection/protection system rules, and sending the packet inspection plan to a network distribution device to inspect packets according to the packet inspection plan.

DETAILED DESCRIPTION

Figure 1:
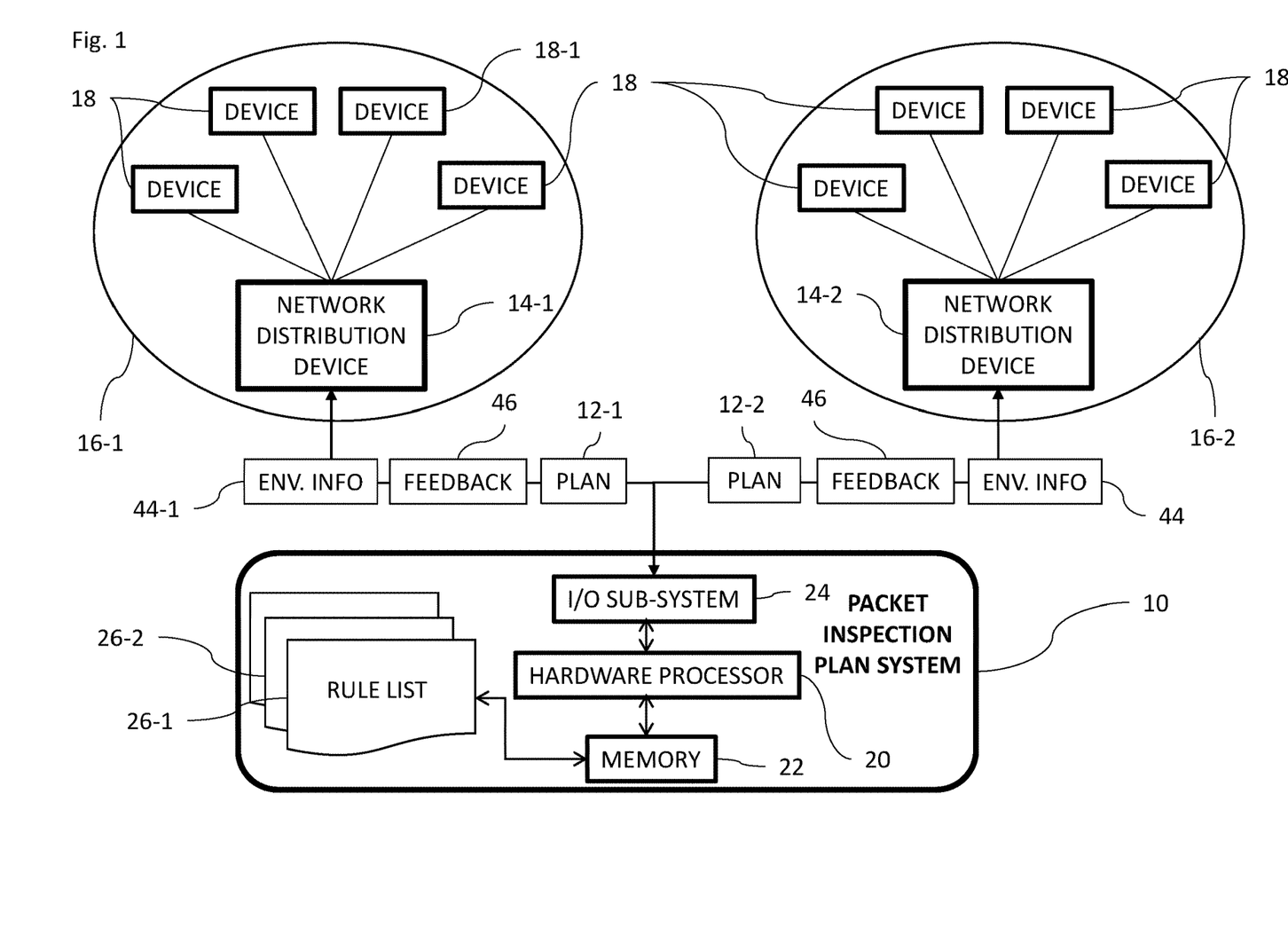
FIG. 1 is a block diagram view of a packet inspection plan system constructed and operative in accordance with an embodiment of the present disclosure.

Reference is now made to FIG. 1, which is a block diagram view of a packet inspection plan system 10 constructed and operative in accordance with an embodiment of the present disclosure. The packet inspection plan system 10 is operative to provide packet inspection plans 12 for a plurality of network distribution devices 14, for example, but not limited to, home gateways, routers, network gateways or Fog nodes. Two network distribution devices 14 are shown in FIG. 1 for the sake of simplicity. Each packet inspection plan 12 includes a list of Intrusion Protection System (IPS) or Intrusion Detection System (IDS) rules that are to be employed by the receiving network distribution devices 14 when inspecting incoming packets.

The packet inspection plan system 10 is particularly useful for resource constrained network distribution devices 14. The term "resource constrained" is described in more detail below. However, one ordinarily skilled in the art will appreciate that the packet inspection plan system 10 may be implemented in any suitable system.

In the exemplary embodiment of FIG. 1, each network distribution device 14 is a home gateway to a home network 16 including a plurality of home network devices 18. The home network devices 18 may include home appliances for example, but not limited to, refrigerators, freezers, sensors, cameras, heating systems, cooling systems, ovens, stoves, dishwashers, washing machines, personal computers, lighting systems and home entertainment systems etc. The home network devices 18 may receive software, software updates and other data from a manufacturer associated with each of the home network devices 18 via a service of the manufacturer. The services may also be used to monitor and control the home network devices 18 within a home automation setting. Each service is generally associated with a different manufacturer. The home network devices 18 may also receive actions and other data from a user of the home network devices 18, for example, in order to affect actions on the home network devices 18. The user may select the actions using an application running on a mobile device of the user, by way of example only. Each action may be routed from the mobile device via the manufacturer specific service of the manufacturer and via the relevant network distribution device 14 to the relevant home network device 18. Each network distribution device 14 inspects packets destined for the home network devices 18 in its home network 16 according to Intrusion Protection System (IPS) or Intrusion Detection System (IDS) rules. In many home gateways, the IPS/IDS may be implemented in operating system (OS) user space and not kernel space, generally making deep packet inspection costly. The network distribution devices 14 may be termed "a constrained device" in that the network distribution devices 14 is unable to inspect all incoming packets using all IPS/IDS rules using a proportion of its resources. By way of example, a home gateway that supports 300 Mb/s downstream bandwidth may route 100% of packets arriving up to this bandwidth to home network devices 18, including applying some IPS/IDS rules. The home gateway may perform Deep Packet Inspection (DPI) on packets up to 5% of the total downstream bandwidth (i.e. up to 15 Mb/s) without using more than 10% of the total resources available to home gateway (central processing unit (CPU) and random access memory (RAM)). A Service Provider which provides the home gateway may not want to allocate more than 10% of the total resources of the home gateway to the task of DPI. In such a sense, the home gateway is said to be "constrained" with respect to performing DPI on the packets. It should be noted that the packet inspection plan system 10 may be implemented to provide the packet inspection plans 12 to any suitable device including network distribution devices 14 for network including non-household appliances, for example, but not limited to, computer equipment, telecommunication equipment, factory equipment etc.

The packet inspection plan system 10 includes a hardware processor 20, a memory 22 and an input/output sub-system 24. The memory 22 is operative to store data used by the hardware processor 20. The hardware processor 20 is operative, for each time period of a plurality of time periods, to: perform a weighted random (the term "random" including pseudo-random) selection of a first set of intrusion detection/protection system rules from a first plurality of rules 26-1; and prepare a packet inspection plan 12-1 including the first set of intrusion detection/protection system rules. It will be appreciated that the time periods may be of equal or unequal length. The duration of the time periods is discussed in more detail below. Each packet inspection plan 12-1 may also include what percentage of packets are to be checked for each rule with possibly different percentages given for different rules. Each rule of the first plurality of rules 26-1 has an associated probability of selection in the weighted random selection based on a weight or priority of that rule. The term "weighted random selection" is defined as selecting items from a selection in a random manner while giving a higher priority of selection to items with a higher weighting/priority. The selection of rules included in each packet inspection plan 12-1 for the network distribution device 14-1 is dynamic. Dynamically changing the rules included in the packet inspection plans 12-1 may allow for probing or testing rules to determine whether rules should be selected more often or less often. The priority/weight of a rule may be adjusted in order to change its probability of selection. The dynamically selected first set of rules are termed "probe rules". Probing and testing are described in more detail below.

Each packet inspection plan 12-1 may also include a second set of intrusion detection/protection system rules, termed "basic rules" which are considered to be a higher priority than other rules for security of the network distribution device 14-1. The second set of intrusion detection/protection system rules is generally less dynamic than the first set of intrusion detection/protection system rules, typically remaining unchanged for a multiplicity of time periods. In such a case, the hardware processor 20 is operative to: prepare the second set of intrusion detection/protection system rules for inclusion in the packet inspection plan 12-1 for two or more time periods of the plurality of time periods; and include the second set of intrusion detection/protection system rules in the packet inspection plan 12-1. The second set of intrusion detection/protection system rules has a higher priority than the first set of intrusion detection/protection system rules and typically each rule in the second set has a higher priority than each rule in the first set.

Both the first and the second set of intrusion detection/protection system rules may be selected from the first plurality of rules 26-1 as follows. The first plurality of rules 26-1 may include: rules having a probability of selection of less than 1 corresponding to "probe rules"; and rules having a probability of selection of 1 corresponding to "basic rules". In such a way, the first set and the second set of intrusion detection/protection system rules may be both be selected from the first plurality of rules 26-1 resulting in "basic rules" and "probe rules" for each packet inspection plan 12 selected from the first plurality of rules 26-1. As the priority of the rules changes over time, "basic rules" may become "probe rules", and vice-versa. It was mentioned above that adjusting the probability of selection of one or more rules may be implemented by changing the weighting/priority of the rules, by way of example. It will be appreciated that "basic rules" may be allotted a high enough weighting/priority to ensure that all the "basic rules" are selected in each time period from the first plurality of rules 26-1. The input/output sub-system 24 is operative to send the packet inspection plan 12-1 to the network distribution device 14-1 to inspect packets according to the packet inspection plan 12-1.

A new packet inspection plan 12-1 is prepared periodically and sent to the network distribution device 14-1. The timing of preparation and sending of the new packet inspection plan 12-1 may depend on various factors including changes in the home network 16-1 of the network distribution device 14-1, for example, but not limited to, starting a new period when one of the home network devices 18 enters or leaves the home network 16-1; receiving feedback from the network distribution devices 14, for example, detection of malicious activity over a certain limit may trigger starting a new period; and how long "probe rules" should be tested for in order to provide useful feedback data.

The first plurality of rules 26-1 may be used when preparing the packet inspection plans 12 for any network distribution device 14 or for a certain class of network distribution devices 14. In such a scenario, the hardware processor 20 may have to adjust the number of rules and/or the probability of selection of one or more of the rules and/or the ratio of "basic rules" to "probe rules" included in the packet inspection plan 12 based on factors which are specific to each network distribution device 14, for example, but not limited to, processing power available for inspecting packets and specific known security risks associated with the network distribution device 14 and the home network 16 of the network distribution device 14.

Alternatively, different pluralities of rules 26 may be used for different network distribution devices 14. In the example of FIG. 1, the hardware processor 20 is operative to, for each time period of a plurality of time periods: perform a weighted random selection of a set of intrusion detection/protection system rules from a second plurality of rules 26-2 (different from the first plurality of rules 26-1) for the network distribution device 14-2, each rule of the second plurality of rules 26-2 having an associated probability of selection; and prepare a packet inspection plan 12-2 including the second set of intrusion detection/protection system rules. The input/output sub-system 24 is operative to send the packet inspection plan 26-2 to the network distribution device 12-2 to inspect packets according to the second packet inspection plan 12-2.

Where different pluralities of rules 26 are used for different network distribution devices 14, the different first pluralities of rules 26 may be prepared based on one or more master rule sets by customizing the master rule set(s) based on adjusting the number of rules and/or the probability of selection of one or more of the rules based on factors which are specific to each network distribution device 14, for example, but not limited to, processing power available for inspecting packets and specific known security risks associated with the network distribution device 14 and security risks of the home network 16 of the network distribution device 14. Preparation of the plurality of rules 26 and master rule sets are described in more detail below with further reference to FIG. 1.

Figure 2:
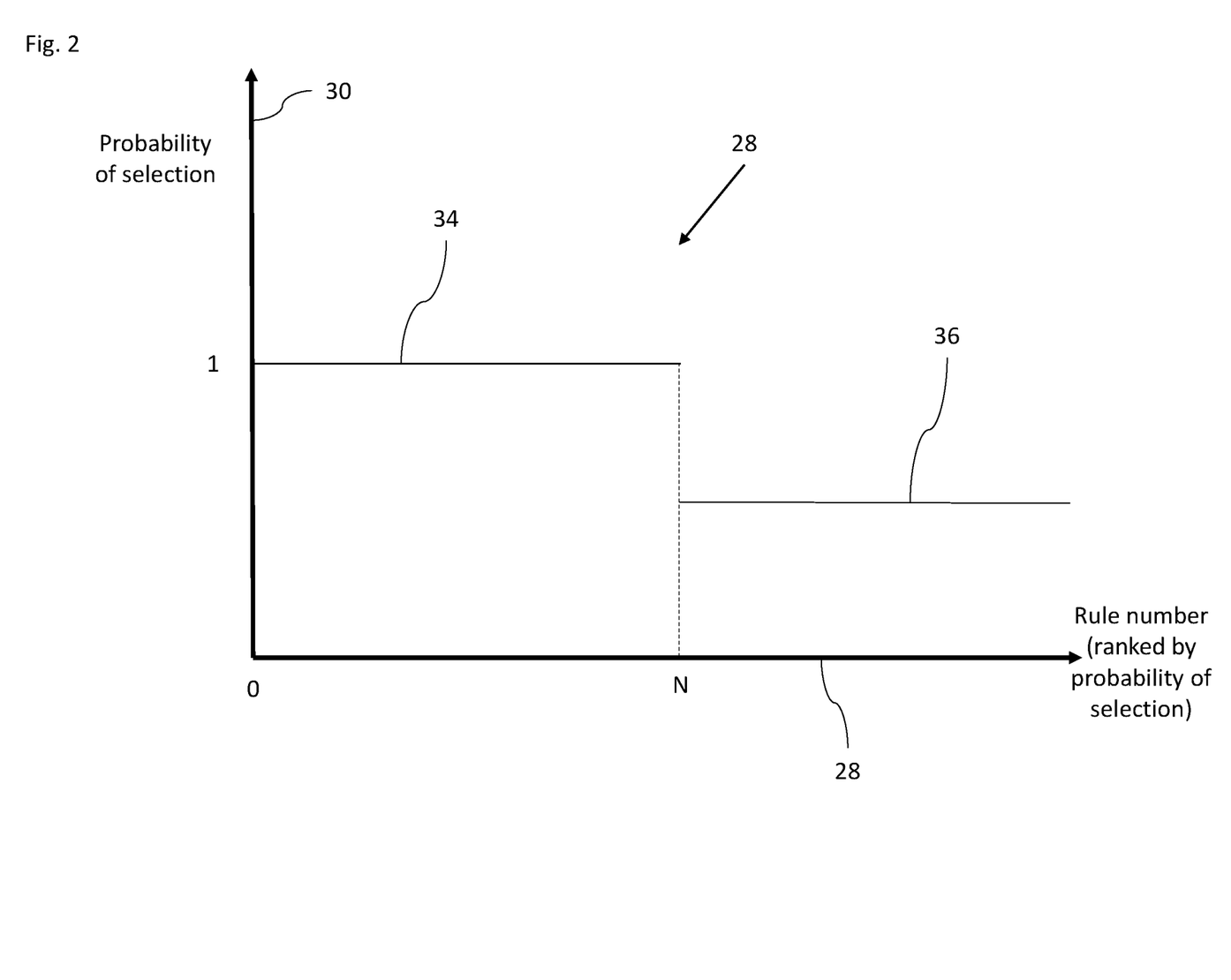
FIG. 2 is a graph showing an exemplary relationship between the probability of selection and rule number for use in the system of FIG. 1.

Reference is now made to FIG. 2, which is a graph 28 showing an exemplary relationship between the probability of selection (axis 30) and rule number (axis 32) ranked by probability of selection for use in the system 10 of FIG. 1. The graph 28 shows that rules 0 to N have a probability of selection of 1, corresponding to "basic rules" (region 34), and rules N+1 and above having a probability of selection less than one, corresponding to "probe rules" (region 36). The graph 28 may represent rules forming part of one of the pluralities of rules 26 (FIG. 1) or a master rule set. The region 36 shows that the "probe rules" all have an equal probability of selection which may represent an initial setting which is adjusted as "probe rules" are tested.

Figure 3:
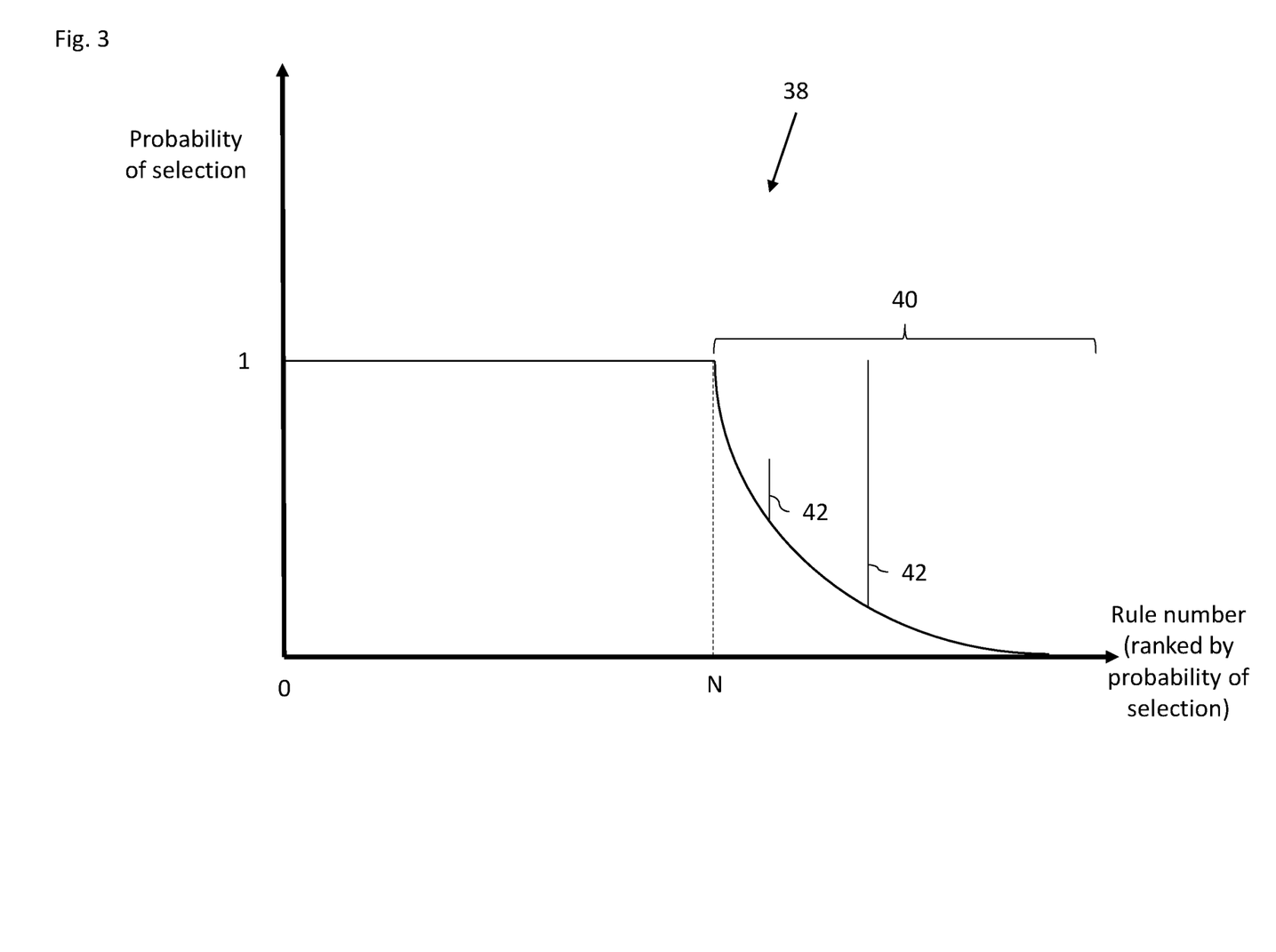
FIG. 3 is a graph showing an alternative exemplary relationship between the probability of selection and rule number for use in the system of FIG. 1.

Reference is now made to FIG. 3, which is a graph 38 showing an alternative exemplary relationship between the probability of selection and rule number ranked by probability of selection for use in the system of FIG. 1. A region 40 of the graph 38 corresponds to "probe rules". The region 40 shows spikes 42 in a curve of the graph 38. The spikes 42 may represent rules which have been singled out for testing and therefore have had their probability of selection artificially increased.

Reference is again made to FIG. 1. If the plurality of rules 26 is tailored to a particular network distribution device 14, then the hardware processor 20 may select the "basic rules" which are considered appropriate for that network distribution device 14 from a master rule set for inclusion in the first plurality of rules 26. The hardware processor 20 then assigns a weighting/priority/probability of selection to the selected rules to ensure that the "basic rules" are selected for the packet inspection plans 12. If there are not enough resources for the "basic rules" to run, the basic rules which have a lower priority in the master rule set may be relegated to "probe rules". Alternatively, some or all of the "basic rules" may be marked for running at an inspection rate of less than 100% of the packets. Some of the resources, either a fixed amount or a percentage, may be reserved for "probe rules" further reducing the scope of how many "basic rules" can be run. The ratio between "basic rules" and "probe rules" may be environment dependent based on the various security risks in different environments. Rules from the master rule set which are not selected as "basic rules" may be selected as "probe rules". The weighting/priority/probability of selection of the "probe rules" in the master rule set may also be used in the plurality of rules 26 for that network distribution device 14. Alternatively, the weighting/priority/probability of selection of one or more of the "probe rules" may be amended.

The pluralities of rules 26 and master rule sets may be prepared based on various factors, including one or more of the factors listed below. Rule weighting/priority/probability of selection may be based on expected resource utilization to inspect packets using that rule. For example, some rules may include searching every packet, while others may include searching User Datagram Protocol (UDP) packets to port 12345. In some cases, maximizing the possible protection may entail forgoing a resource-expensive, but important, rule, to allow the inclusion of many slightly lower importance rules that are less resource-expensive. The resource cost of a rule may be known a priori, or may be computed dynamically by having each device report the estimated resource usage for processing each rule. For example, usage may be approximated by averaging the overhead of packet processing over all the rules, and adding in the additional central processing unit (CPU) time spent running this rule. Rules and resources used per rule may be input from an external system or by user input.

Other factors related to preparing rules may include: environment, e.g., certain environments may dictate a higher percentage of "basic rules", other may not; network topology, for example, certain networks may pose certain security risks and therefore priority may be given to rules addressing those risks; and device types in the home network, susceptibility of a home to attack based on posture assessment data by way of example only, geography, social group and security in place may pose certain security risks which may be addressed with certain rules which may become "basic rules" or receive a higher weighting/priority/probability of selection. For example, a device with port 80 open may result in Hypertext Transfer Protocol (HTTP) and Apache rules being applied as "basic rules". By way of another example, latest detected attacks in a network within certain proximity of a home may have to be addressed by applying appropriate rules. Rules are often tagged with metadata that associates them with specific attacks, and often the specific attacks have been rated for severity and tagged with other attributes. Experts may determine that a rule is relevant for a certain device (e.g., an LG® TV runs Android, so all Android® rules may apply, Western Digital (WD®) Network Attached Storage (NAS) drive runs Ubuntu®, so Linux® and Ubuntu® rules may apply). Another parameter to be considered is the cost of damage that could be done to the typical devices that a rule is protecting.

The plurality of rules 26 may be updated based on various factors including: devices entering or leaving the home network 16 of the network distribution device 14; performance of the network distribution device 14; new attacks in the home network 16 or in home networks 16 in general; attack frequency in the home network 16 drops; learning what devices were present in the home network 16 when a certain "probe rule" blocked an attack or based on any of the factors described above. For example, if an attempted attack on port 437 is blocked by a probe rule, and this port is often open when a Philips® lighting system is present, then we may learn that the rule applies to that device. Additionally, rule priority/weighting/probability of selection may also be amended based on the number, frequency and/or proximity of probe rules that blocked an attack. One parameter is a measure of how often the rule blocks traffic. This could be a geometric average of the past 100 days of data per rule. Typically this would be calculated each day at (number of block events/number of devices this rule is deployed upon). By way of example only, a prioritization score for each rule might be measures as: daily_average_blocks_per_device*rule_attack_severity/ CPU_cost_of_rule.

The input/output sub-system 24 is operative to receive information 44 about an environment in which each network distribution device 14 operates. The information 44 may be used to determine rule priority/weighting/probability of selection for the plurality of rules 26 of the reporting network distribution device 14-1 and possibly for other network distribution devices 14 having the same or similar environment as described in more detail below.

As described above, a weighted random selection of rules from the first plurality of rules 26-1 may be used as "probe rules" to see if the selected rules detect an intrusion and how often and in what environments. If a rule detects intrusions above a predetermined limit, the rule's priority/weighting/ probability may be increased so that the rule is selected more frequently or even moved to the "basic rule" category in the first plurality of rules 26-1. It should be noted that a rule's priority/weighting/probability may be initially set, and/or adjusted, differently in different environments. For example, rule(s) that block(s) an attack on a Linux® system might not be run in homes. However, using the "probe rules" of the packet inspection plan system 10, some subset of the network distribution devices 14 may nonetheless receive the rule(s) in different time periods. At a later point in time, attackers may decide to target this attack on homes. The probe rule(s) would match attack attempts, and thereby the priority of the rule(s) would quickly increase.

Probing is now described in some more detail. The input/output sub-system 24 is operative to receive feedback 46 from the network distribution devices 14 about which rules from the plurality of rules 26 have detected an intrusion and how often during packet inspection. The hardware processor 20 is operative to increase or decrease the probability of selection (which may be achieved by increasing weighting and/or priority) of a rule(s) based on the feedback about intrusion detection of that rule(s). Whenever a probability of a rule is changed based on feedback 46 from a network distribution device 14, or combined feedback 46 from more than one network distribution device 14, the packet inspection plan system 10 determines whether may change the probability of the rule in the plurality of rules 26 for the network distribution device(s) 14 sending the feedback 46 or for all other rules sets or for the plurality of rules 26 in a same, or similar, environment as the network distribution device(s) 14 providing the feedback 46. Similarly, the hardware processor 20 may be operative to increase or decrease the probability of selection associated with a rule based on the feedback 46 about intrusion detection of that rule from network distribution devices 14 in a first type of network environment but not based on the feedback about intrusion detection of that rule from network distribution devices 14 in a second type of network environment different from the first type of network environment. Whether rule probabilities are changed across network boundaries may be configuration specific and/or dependent on how similar different environments are to each other. The packet inspection plan system 10 may be operative to create a map of attacks on the home network 16 based on the feedback 46 and find similarities between the attacks and the networks 16 that were attacked based on, by way of example only, device types/models, network configuration and location. The packet inspection plan system 10 may then be operative to set/adjust the priority/weighting/probability of one or more of the plurality of rules 26 per network distribution device 14 by predicting the most likely attacks on that network distribution device 14 and the home network 16 of that network distribution device 14.

A different number of "probe rules" and/or the resources allotted to "probe rules" versus "basic rules" may be different for different network distribution devices 14. Some network distribution devices 14 may have a more difficult job protecting their home networks 16 than others (e.g. one home has just two networked devices from one vendor, another home has dozens of home network devices 18 from many vendors). The network distribution devices 14 having a more difficult job protecting their home network 16 may be allotted fewer "probe rules" than other network distribution devices 14 so that they can run more "basic rules".

The following is a non-limiting example, of allotting "basic rules" and "probe rules". The network distribution device 14-1 is constrained to run 100 rules from the first plurality of rules 26-1. The hardware processor 20 allots ninety "basic rules" from the first plurality of rules 26-1 based on 10 rules with highest priority/weighting of the rules. The priorities/weightings are determined by the hardware processor 20 based on the current posture, topology and most recent known attacks in the proximity of the home network 16-1, for example, based on the knowledge that the home network 16-1 includes a Samsung® TV, and an LG® Connected Refrigerator, a Macintosh®, and two Nexus® phones. For the remaining ten rules, the hardware processor 20 selects ten "probe rules" from the first plurality of rules 26-1 using a weighted random selection as described above. The first plurality of rules 26-1 may include 40,000 or more rules, or a lesser amount, such as 5000 rules that a Service Provider (SP) determined are more relevant for the home network 16-1.

Coverage of all 40000 rules for probing is possible even in a single period of time, as shown by the following example. Given an SP serving five million homes, if each of home is running 10 random rules, then on average, every rule should be in about 1250 homes (10×5 million/40000) each time period.

The priority/weighting/probability of a rules may be increased in order to test certain rules generally or in certain environments. For example, certain homes may be pre-selected to test certain rules. The hardware processor is operative to increase the probability of selection of a rule of the plurality of rules 26 (generally or in certain environments) in order to increase the likelihood of that rule being tested.

Additionally, the aforementioned "topology" which affects the dynamic assessment of risk and thereby priority, may be viewed as dynamic, to accommodate networks with high degrees of mobility. Thus a network might have a mobile phone enter it, thereby triggering the inclusion of additional rules to protect that mobile phone. Once the mobile phone leaves the network, those additional rules may be de-prioritized. This process could also be triggered by a local discovery agent that knows when devices join and leave the network. The input/output sub-system 24 is operative to receive the environment information 44-1 including when a device is added to, and/or leaves, the home network 16-1. The hardware processor 20 is operative to: add a rule to the first plurality of rules 26-1 or change the probability of selection of that rule in the first plurality of rules 26-1 when a home network device 18-1 is added to the home network 16-1 of the network distribution device 14-1; and remove that rule from the first plurality of rules 26-1 or change the probability of selection of that rule when the home network device 18-1 leaves the home network 16-1.

Furthermore, the hardware processor 20 may, based on rule priority and other factors (including available resources to run rules in the network distribution devices 14), recalibrate one or more of the rules so that less than 100% of the packets are inspected for the recalibrated rules. The percentage may be adjusted if the rule detects attacks. For example, a rule may be set to check 10% of the packets until an attack is detected, at which point the rule may be adjusted to inspect 100% of the packets. This dynamic adaptation may occur automatically on the network distribution device 14 based on a policy promulgated from the packet inspection plan system 10, or triggered by the packet inspection plan system 10 when an event is reported.

Figure 4:
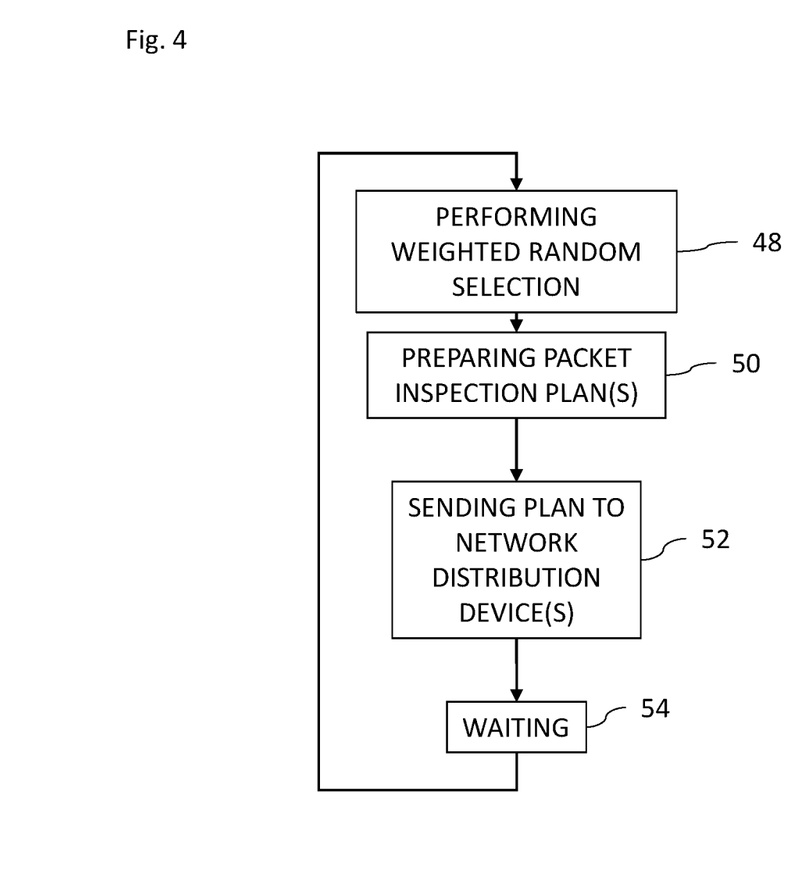
FIG. 4 is a flow chart of a first part of an exemplary method of operation of the system of FIG. 1.

Reference is now made to FIG. 4, which is a flow chart of a first part of an exemplary method of operation of the system 10 of FIG. 1. The method includes the following steps: performing a weighted random selection of a first set of intrusion detection/protection system rules from the first plurality of rules 26-1 (FIG. 1) (block 48); preparing a packet inspection plan including the first set of intrusion detection/protection system rules (block 50); and sending the packet inspection plan to a network distribution device to inspect packets according to the packet inspection plan (block 52). The method then includes a "waiting" step at a block 54 until continuing with the step of block 48 in a new time period.

Figure 5:
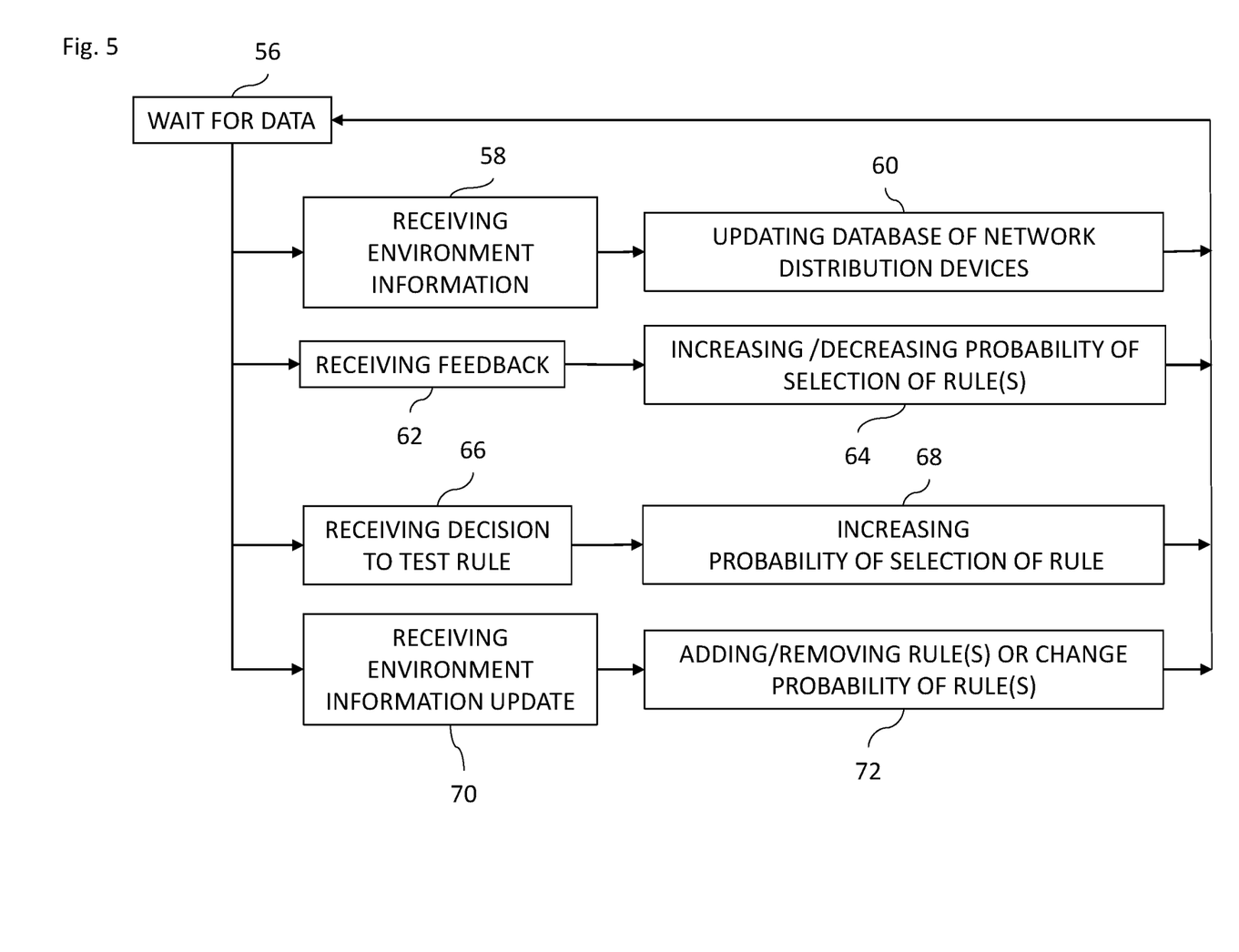
FIG. 5 is a flow chart of a second part of an exemplary method of operation of the system of FIG. 1.

Reference is now made to FIG. 5, which is a flow chart of a second part of an exemplary method of operation of the system of FIG. 1. Reference is also made to FIG. 1. The method starts at a block 56 which includes waiting for data.

The method includes different data events that could be received as follows and different actions which are performed when the data is received.

The method includes receiving environment information 44 (block 58) and updating a database (typically stored in the memory 22) of network distribution devices 14 (block 60) indicating which network distribution devices 14 are associated with which environments, including listing the home network devices 18 included in the home network 16 of each network distribution device 14. The method continues with block 56.

The method also includes receiving feedback 46 about a rule (block 62) and increasing or decreasing the probability of selection of that rule based on the feedback 46 (block 64). The method continues with block 56.

The method additionally includes receiving a decision to test a rule (block 66) and increasing the probability of selection of that rule (block 68). The method continues with block 56.

The method further includes receiving an environment information update (e.g., a home network device 18-1 joining or leaving the home network 16-1) (block 70) and adding/removing rule(s) or changing probabilities of selection of existing rule(s) based on the environment information update (block 72). The method continues with block 56.

In practice, some or all of the functions described hereinabove may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A method comprising, for each one time period of a plurality of time periods:
    performing a weighted random selection of a first set of intrusion detection/protection system rules from a first plurality of rules in a random manner while giving a higher priority of selection to each rule of the first plurality of rules having a higher associated probability of selection;
    preparing a packet inspection plan including the first set of intrusion detection/protection system rules by adjusting a ratio of one or more basic rules to one or more probe rules in the packet inspection plan based on a processing power available to a network distribution device to inspect packets, wherein the one or more probe rules are for determining how one or more rules of the first plurality of rules should be selected;
    sending the packet inspection plan to the network distribution device to inspect the packets according to the packet inspection plan; and
    changing a probability of selection of a first rule from at least one of the first plurality of rules when a first device leaves a network of the network distribution device.

2. The method according to claim 1, wherein the one or more basic rules are for inclusion in the packet inspection plan for at least two time periods of the plurality of time periods, wherein each of the one or more basic rules has a higher priority than each of the one or more probe rules.

3. The method according to claim 1, wherein the one or more basic rules each has a probability of selection of 1.

4. The method according to claim 1, further comprising:
    receiving, from a plurality of network distribution devices including the network distribution device, feedback about which of the one or more probe rules have detected an intrusion and how often the intrusion is detected while the network distribution device inspects the packets; and
    increasing or decreasing a probability of selection of a given rule of the first plurality of rules based on the feedback.

5. The method according to claim 4, further comprising:
    receiving information about respective network environments in which each of the plurality of network distribution devices operates; and
    increasing or decreasing the probability of selection associated with the given rule based on the feedback from one or more of the plurality of network distribution devices in a first type of network environment but not based on the feedback from one or more of the plurality of network distribution devices in a second type of network environment different from the first type of network environment.

6. The method according to claim 1, further comprising:
    increasing a probability of selection of a given rule of the first plurality of rules in order to increase a likelihood of the given rule being tested.

7. The method according to claim 1, wherein a probability of selection of each rule of the first plurality of rules is based on an expected resource utilization to inspect the packets using each rule.

8. The method according to claim 1, further comprising:
    changing the probability of selection of the at least one of the first plurality of rules when the first device is added to the network of the network distribution device.

9. The method according to claim 1, further comprising:
    performing a weighted random selection of a second set of intrusion detection/protection system rules from a second plurality of rules for a second network distribution device, each rule of the second plurality of rules having an associated probability of selection;

preparing a second packet inspection plan including the second set of intrusion detection/protection system rules; and sending the second packet inspection plan to the second network distribution device to inspect further packets according to the second packet inspection plan.

10. The method according to claim 9, wherein the first plurality of rules is different from the second plurality of rules.

11. A system comprising:
a memory operative to store data used by a hardware processor; and
the hardware processor, wherein the hardware processor is operative, for each one time period of a plurality of time periods, to:
perform a weighted random selection of a first set of intrusion detection/protection system rules from a first plurality of rules in a random manner while giving a higher priority of selection to each rule of the first plurality of rules having a higher associated probability of selection;
prepare a packet inspection plan including the first set of intrusion detection/protection system rules by adjusting a ratio of one or more basic rules to one or more probe rules in the packet inspection plan based on a processing power available to a network distribution device to inspect packets, wherein the one or more probe rules are for determining how one or more rules of the first plurality of rules should be selected;
send the packet inspection plan to the network distribution device to inspect the packets according to the packet inspection plan; and
change a probability of selection of at least one of the first plurality of rules when a first device leaves a network of the network distribution device.

12. The system according to claim 11, wherein the one or more basic rules are for inclusion in the packet inspection plan for at least two time periods of the plurality of time periods, wherein each of the one or more basic rules has a higher priority than each of the one or more probe rules.

13. The system according to claim 11, wherein the hardware processor is operative to:
receive, from a plurality of network distribution devices including the network distribution device, feedback about which of the one or more probe rules have detected an intrusion and how often the intrusion is detected while the network distribution device inspects the packets; and
increase or decrease a probability of selection of a given rule of the first plurality of rules based on the feedback.

14. The system according to claim 13, wherein the hardware processor is operative to:
receive information about respective network environments in which each of the plurality of network distribution devices operates; and
increase or decrease the probability of selection associated with the given rule based on the feedback from one or more of the plurality of network distribution devices in a first type of network environment but not based on the feedback from one or more of the plurality of network distribution devices in a second type of network environment different from the first type of network environment.

15. The system according to claim 11, wherein the hardware processor is operative to increase a probability of selection of a given rule of the first plurality of rules in order to increase a likelihood of the given rule being tested.

16. A software product, comprising a non-transient computer-readable medium in which program instructions are stored, which instructions when run perform:
for each one time period of a plurality of time periods, performing a weighted random selection of a first set of intrusion detection/protection system rules from a first plurality of rules in a random manner while giving a higher priority of selection to each rule of the first plurality of rules having a higher associated probability of selection;
for each one time period of the plurality of time periods, preparing a packet inspection plan including the first set of intrusion detection/protection system rules by adjusting a ratio of one or more basic rules to one or more probe rules in the packet inspection plan based on a processing power available to a network distribution device to inspect packets, wherein the one or more probe rules are for determining how one or more rules of the first plurality of rules should be selected;
sending the packet inspection plan to the network distribution device to inspect the packets according to the packet inspection plan; and
changing a probability of selection of at least one of the first plurality of rules when a first device leaves a network of the network distribution device.

17. The software product according to claim 16, wherein the one or more basic rules are for inclusion in the packet inspection plan for at least two time periods of the plurality of time periods, wherein each of the one or more basic rules has a higher priority than each of the one or more probe rules.

18. The method according to claim 1, wherein changing the probability of selection of the at least one of the first plurality of rules includes changing the probability of selection of the at least one of the first plurality of rules based on a local discovery agent that tracks when the first device leaves the network.

19. The software product according to claim 16, wherein the one or more basic rules each has a probability of selection of 1.

20. The software product according to claim 16, wherein the instructions when run further perform:
receiving, from a plurality of network distribution devices including the network distribution device, feedback about which of the one or more probe rules have detected an intrusion and how often the intrusion is detected while the network distribution device inspects the packets; and
increasing or decreasing a probability of selection of a given rule of the first plurality of rules based on the feedback.

* * * * *

UNITED STATES PATENT AND TRADEMARK OFFICE
CERTIFICATE OF CORRECTION

PATENT NO. : 10,785,234 B2  
APPLICATION NO. : 15/189023  
DATED : September 22, 2020  
INVENTOR(S) : Hillel Solow et al.

Page 1 of 1

It is certified that error appears in the above-identified patent and that said Letters Patent is hereby corrected as shown below:

In the Claims

Claim 1, Column 10, Line 15, please replace "selection of a first rule from at" with --selection of at--

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*